J. H. JENSEN.
BAND CUTTER AND FEEDER.
APPLICATION FILED MAY 16, 1904.
1,033,901.
Patented July 30, 1912.
5 SHEETS—SHEET 1.
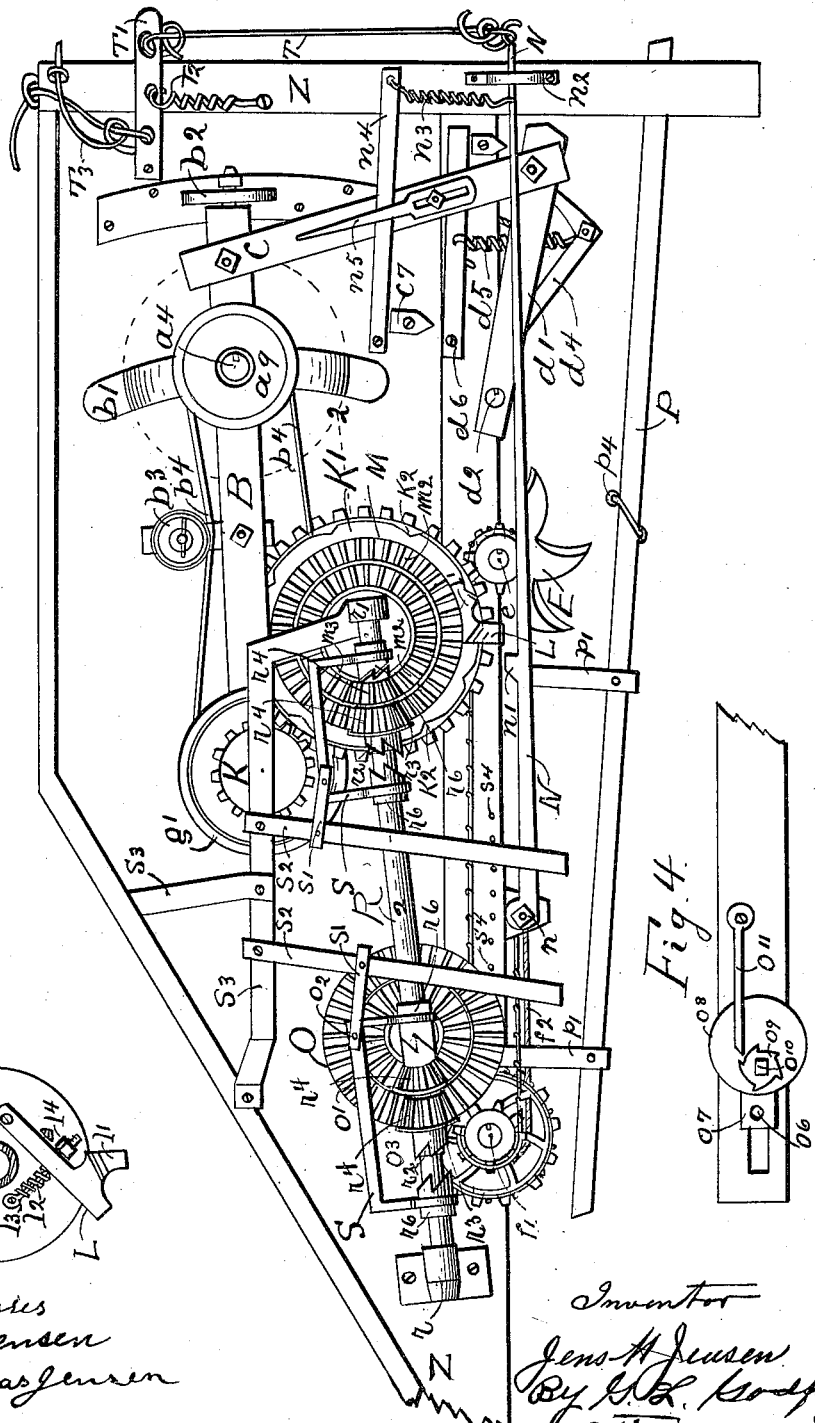

J. H. JENSEN.
BAND CUTTER AND FEEDER.
APPLICATION FILED MAY 16, 1904.
1,033,901.
Patented July 30, 1912.
5 SHEETS—SHEET 2.
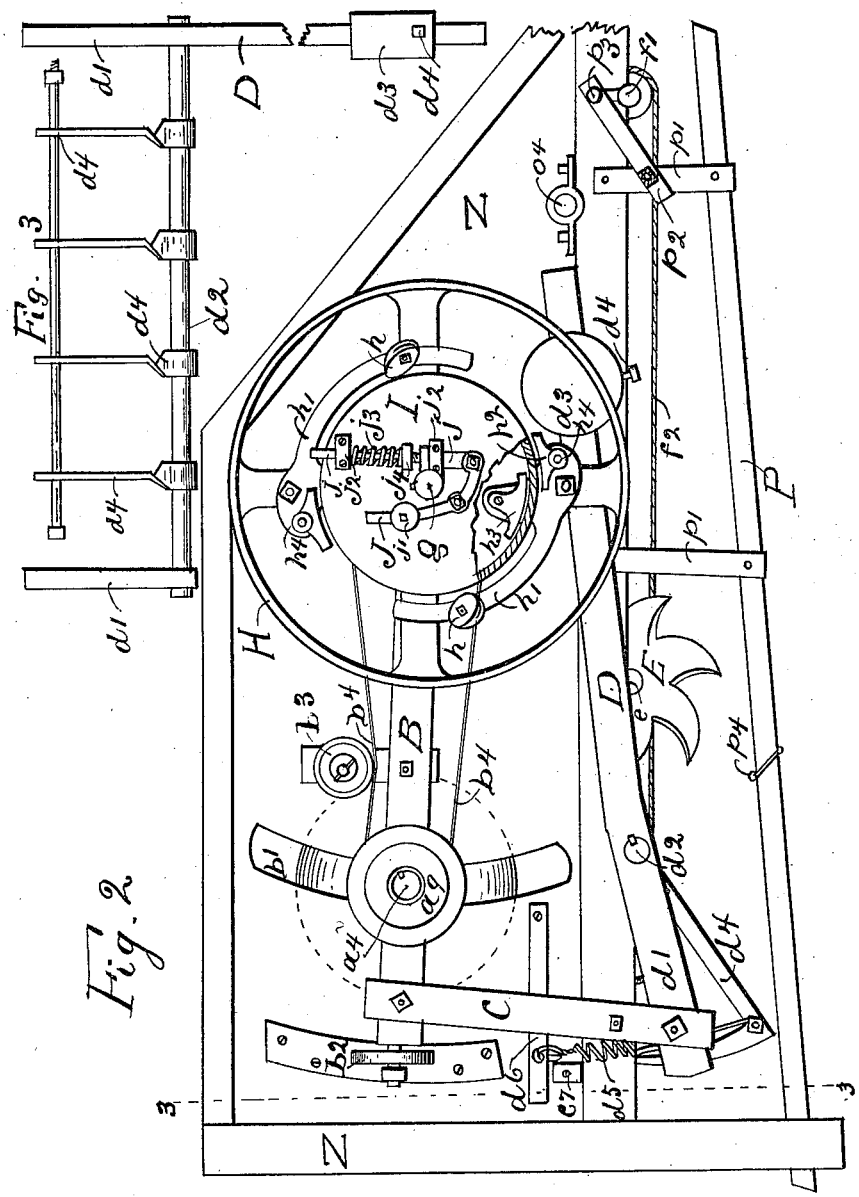

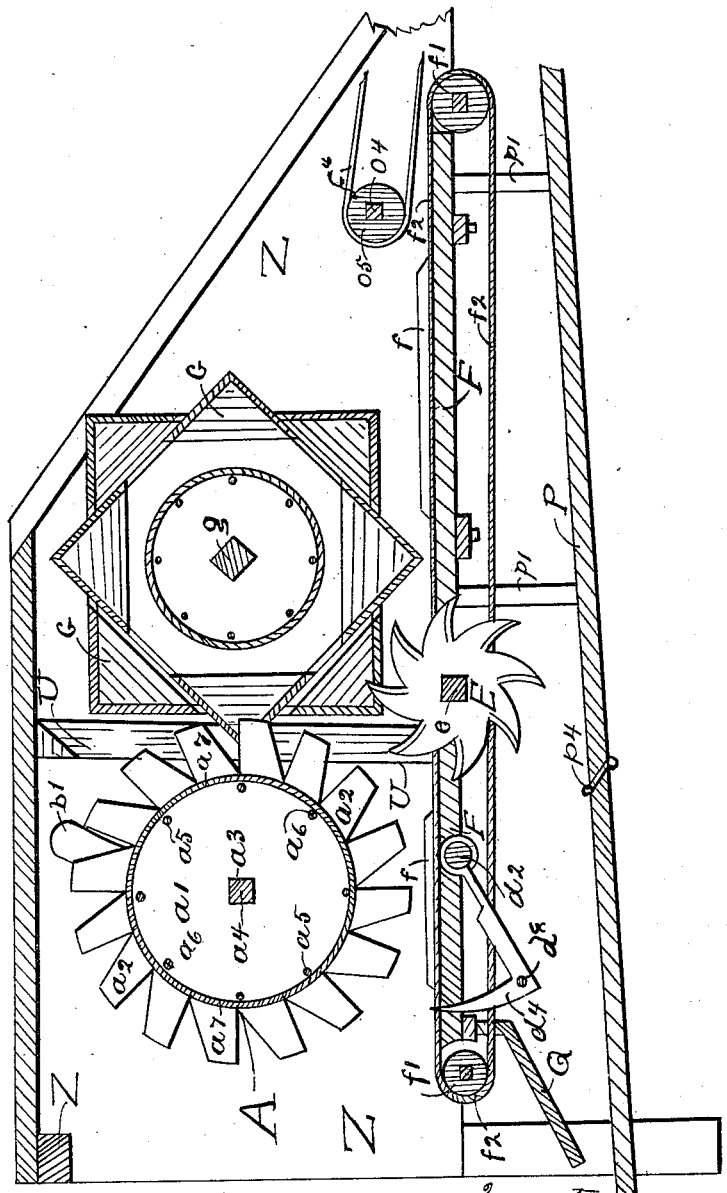

J. H. JENSEN.
BAND CUTTER AND FEEDER.
APPLICATION FILED MAY 16, 1904.
1,033,901.
Patented July 30, 1912.
5 SHEETS—SHEET 4.
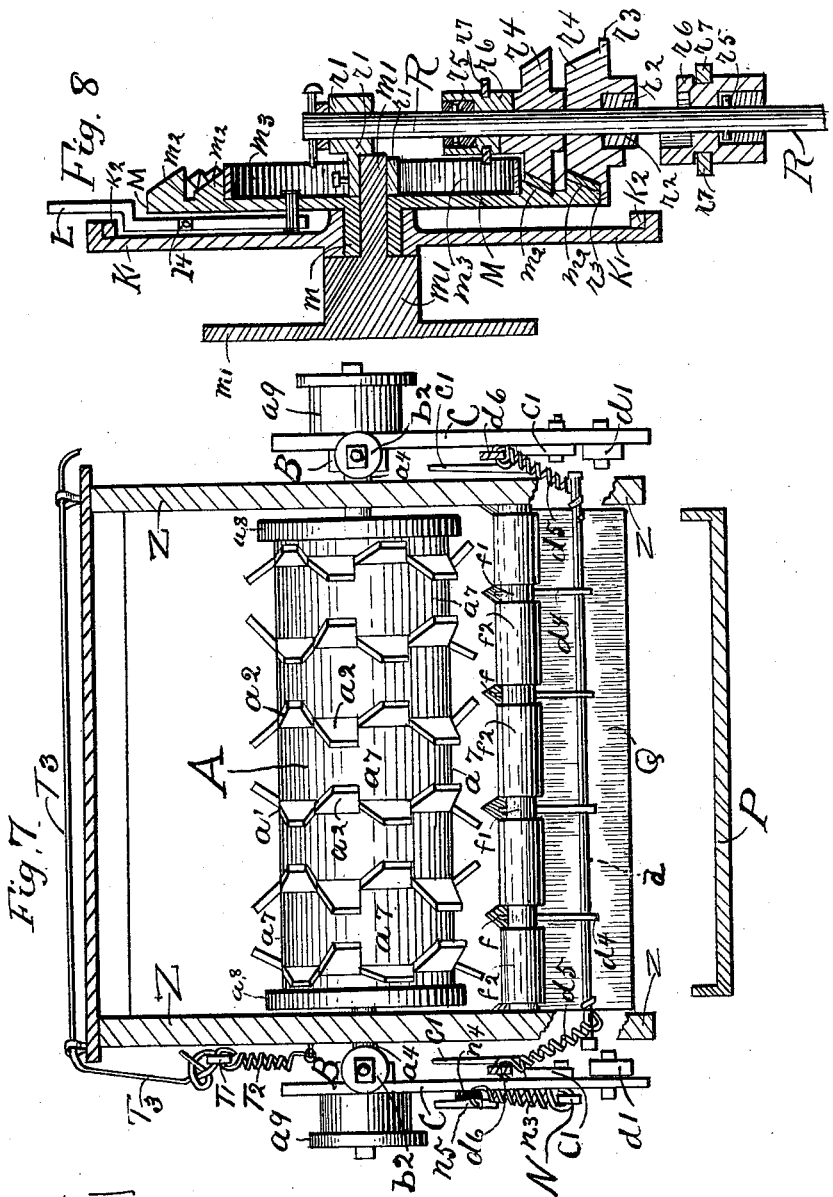

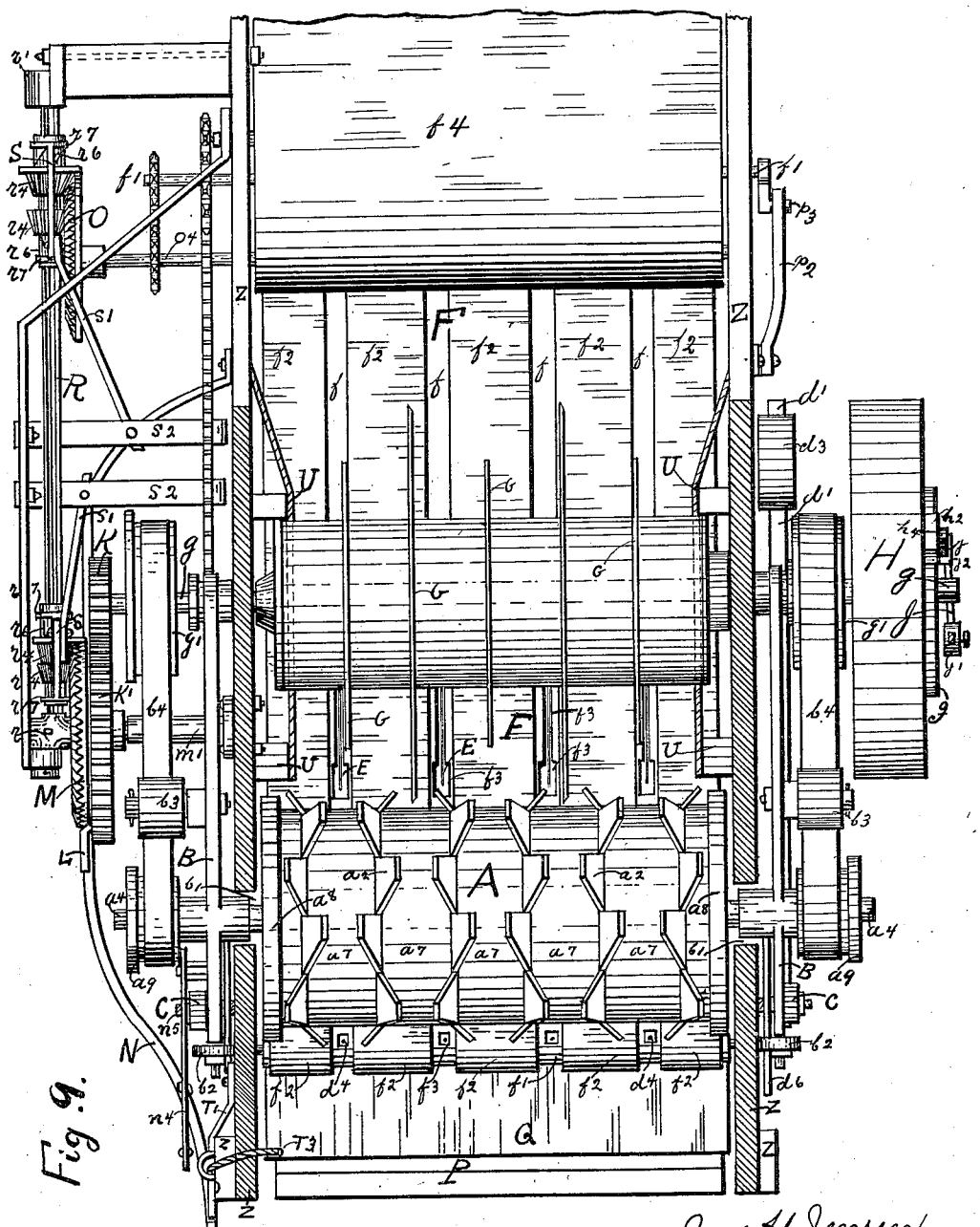

UNITED STATES PATENT OFFICE.

JENS H. JENSEN, OF KEARNEY COUNTY, NEBRASKA.

BAND-CUTTER AND FEEDER.

1,033,901.   Specification of Letters Patent.   Patented July 30, 1912.

Application filed May 16, 1904. Serial No. 208,292.

*To all whom it may concern:*

Be it known that I, JENS H. JENSEN, a citizen of the United States, residing in the county of Kearney and State of Nebraska, have invented certain new and useful Improvements in Band-Cutters and Feeders, of which the following are full, clear, and exact specifications.

My invention relates particularly to feeding and band cutting mechanism for threshing machines employing a sheaf conveyer, and means for automatically regulating the speed of the conveyer, and other parts regulating the quantity to be fed to the threshing machine.

The special object of my invention is to provide improvements in band cutting and feeding mechanism, particular attention being paid to a rotating, floating hollow cylinder trip governor controlling a trip device, governing the flow of the sheaves and spreading the grain evenly over the surface of the thresher cylinder.

A still further and important object of my invention is more effective means by which the excessive quantity of grain or substance is held back, thus absolutely preventing the slugging of the thresher cylinder.

Another and important object of my invention is means by which the sheaf conveyer, and other mechanism, governing the flow of the sheaves, can be stopped and started from any desired point on the thresher separator or feeder.

A still further object of my invention is a grain pan to gather the precipitating kernels and convey them to the thresher cylinder.

With these ends in view my invention consists in features of novelty in the construction, combination and arrangement of parts by which the said objects as well as other certain objects hereinafter appearing are attained, all as fully described with reference to the accompanying drawings and more particularly pointed out in the specification and claims.

In said drawings: Figure 1 is a right side elevation of a portion of the device embodying my improvements. Fig. 2 is a left side elevation thereof. Fig. 3 is a plan view of a part of the balance frame with weight and resisting hooks connected, but detached from the frame of the feeder. Fig. 4 is a sheaf conveyer tightener. Fig. 5 is a rear view of bevel gear showing trip dog and connections. Fig. 6 is a longitudinal sectional view of the device shown in Fig. 1. Fig. 7 is a rear end transverse sectional view, taken on line 3 of Fig. 2. Fig. 8 is an enlarged sectional view of the changeable speed mechanism, taken on line 2—2 Fig. 1. Fig. 9 is a plan view of the device shown in Fig. 1.

A, represents a rotating and floating toothed hollow feed cylinder or feed cylinder trip governor composed of a plurality of metal blades or disks, provided with notched or toothed edges, $a^2$; they are spread alternately to two sides, thereby making them bifurcated, by means of which the teeth, $a^2$, will forcibly draw the grain or material to be threshed, forward and spread it more perfectly to the thresher cylinder. The metal blades, $a^1$, are provided with angular apertures at their centers, $a^3$, fitting the governor shaft, $a^4$, being of the same angular formation, thereby causing the metal blade, $a^1$, to rotate with shaft, $a^4$. The metal blades, $a^1$, are also provided with a plurality of apertures, $a^5$, placed in a circular form at a distance nearer to the circumference than to the center, for the purpose of obtaining support for the cylinder body, without adding great additional weight thereto. Through the aperture, $a^5$, I pass light metal rods, $a^6$, for the purpose of carrying and supporting a plurality of thin circular metal thimbles, $a^7$, which are secured over the rods, and also span the spaces between the metal blades, $a^1$, and at the same time form a large circumference without materially increasing the weight of the cylinder. The large circumference of the cylinder trip governor, A, gives the grain or material to be threshed, more power and effect on it and thereby better enables the grain or material passing under to raise the cylinder, A, when the amount of said material exceeds the quantity desired to be fed to the thresher cylinder. It will also be observed that while great strength is required for the teeth, $a^2$, of the cylinder trip governor, A, to draw and spread the grain or material to the thresher cylinder, at the same time the cylinder trip governor must be of a minimum weight, so as to be more easily lifted by the springy and soft substances of grain or material passing under it. The metal rods, $a^6$, are also inserted through the aperture, $a^5$, of the metal blades, $a^1$, for the further purpose of rigidly securing together the combination of parts forming the floating feed cylinder trip governor, A.

The rods, $a^6$, are secured at the ends with burs in the usual manner. The ends $A^8$, $A^8$, each having a flanged edge are secured to the teeth, $a^2$, covering the burs and ends of rods, $a^6$, and other projecting parts, thereby preventing straw or other material from binding or gathering on the ends of the cylinder and interfering with the free and easy floating of the same.

The counter shaft, $a^4$, which is firmly secured to the cylinder trip governor is journaled in the free ends of the arms B which are pivotally mounted on bearings of shaft, $g$. A pulley, $a^9$, is rigidly secured to each end of the shaft, $a^4$. A curved slot, $b^1$, is made in each of the sides of the feeder frame, Z. Guide rollers, $b^2$, bearing against the plates on the sides of the feeder frame are journaled to the floating ends of the vibrating arms, B, and belt tighteners, $b^3$, are secured to said arms to tighten the belts, $b^4$. Near the free ends of the arms, B, are pivotally secured thereto the upper ends of connecting bars, C, which are also pivotally connected at their lower ends to the loose ends of the supporting arms, $d^1$, of balance frame, D. The rock shaft, $d^2$, of balance frame, D, is journaled in any usual manner to both sides of feeder frame, Z, below the band cutting table. The said supporting arms, $d^1$, are rigidly secured to the ends of the transverse rock shaft, $d^2$, at a right angle to said shaft. A weighted arm is rigidly secured to one end of said rock shaft, $d^2$, extending in the opposite direction of the supporting arms, $d^1$. On said arm is secured a movable weight, $d^3$, in such a manner that it may be moved longitudinally upon the said weighted arm. The said weight is secured by set screw, $d^4$, at any desired place on said arm. It will be seen that the floating cylinder trip governor, A, by the aid of the intermediate connections to the loose ends of the vibrating arms, B, and connecting bars, C, is carried by the supporting arms, $d^1$, of the balance frame, D. It will also be seen that by moving the balance weight, $d^3$, longitudinally upon the arm, $d^1$, I am enabled to either balance or give any desired pressure to the floating cylinder trip governor, A, necessary to perform the functions of spreading the grain on the thresher cylinder, by means of a trip lever which controls the action of the lower feeding mechanism, and raising stopping hooks, $d^4$, thereby governing the flow of material being threshed. By virtue of the large circumference of the cylinder trip governor, A, and its minimum weight which is further reduced by the balance weight secured to the arm of balance frame, D, it will be seen that the softest and most flexible straw or material when passing under it, will cause the governor A to operate equally well with all kinds of grain, thus enabling it to govern the flow of the material to be fed to the thresher cylinder accordingly.

The balance frame, D, the vibrating arms, B, and connecting bars, C, perform a further important function in that of regulating and keeping the floating cylinder trip governor in a horizontal position and parallel to the band cutting table and thresher cylinder. Therefore, it does not make any difference whether the excessive quantity of material being threshed passes centrally or at either end under the cylinder, as the supporting arms, $d^1$, of balance frame, D, are rigidly secured to the transverse rock shaft, making both arms move together, carrying and holding the floating cylinder trip governor, A, accordingly.

Upon the transverse rock shaft, $d^2$, of balance frame, D, are pivotally connected a plurality of stopping hooks, $d^4$, connected at short intervals apart on rod, $d^8$, parallel to each other, near the elbows thereof. The pointed ends of the stopping hooks, $d^4$, are passed through the apertures of the band cutting table and held in their proper positions by spiral springs, $d^5$, the upper ends of said spiral springs being connected to levers, $d^6$, said levers being pivotally secured with one end to the sides of the feeder frame. The other end of each of said levers are placed in the lifting hooks, $c^1$, which are adjustably secured to connecting bars, C. A projection or stop, $c^7$, is secured to the side of the feeder frame to hold the said lever in proper position. It will be seen that when an excessive quantity of grain or material passes under the cylinder trip governor, A, causing it to raise the lever, $d^6$, with it, the latter being connected by springs, $d^5$, to stopping hooks, $d^4$, whereby the pointed end of said hooks are forced upward through the feed table, by means of which the excessive quantity of grain is held back until the cylinder has reduced it to the quantity proper for feeding the thresher cylinder.

The springs, $d^5$, serve as intermediate flexible connections, allowing the cylinder trip governor, A, to float a greater distance than the stopping hooks, $d^4$.

E, represents one blade of a plurality of retarding fingers, the retarding edges of the teeth preferably being sharpened, but not necessarily so; the retarding fingers, E, are rigidly secured to a transverse shaft, $e$, at desired spaces apart, and parallel to each other. The shaft, $e$, has journal bearings in the sides of the feeder frame, below the band cutting table, F, in such a manner that the teeth of the retarding fingers can pass upward through the band cutting table below the upper band knives, G, and cylinder trip governor, A. It will be seen that when the grain or material passes over the sharp retarding fingers E (rotating with the upper band knives and feed cylinder but at a slower rate of speed) it also passes under the upper band knives, G, and feed cylinder trip governor, A, both of which rotate at a much higher speed, thereby projecting the grain and material against the sharp retarding edges of the retarding fingers E so that the bands on the sheaves of grain are severed on both sides. The retarding fingers, E, perform the further function, of more effectively regulating the flow of the material threshed in conjunction with the sheaf conveyer, $f^4$, thus insuring a more perfect control of the material or grain being fed to the thresher cylinder.

F, represents a band cutting table which is firmly fixed to both sides of the feeder frame, Z, and is provided with a number of oblong apertures to admit the entering and rotating of the retarding fingers, E, and stopping hooks, $d^4$. The apertures for the resisting knives, E, however are of greater width at the farther ends, or the ends nearest the thresher cylinder than at the center, in order to prevent clogging and wrapping of any material that may be drawn downward through the apertures of the band cutting table, F. The band cutting table, F, is provided with a number of belt guides secured to the upper surface of the table and with a roller at each end. Upon the rollers between the stopping hooks, $d^4$, belt guides and retarding fingers are placed a plurality of endless belts, $f^2$, of an endless conveyer surrounding the band cutting table; motion being imparted to said belts by the rollers, $f^1$. It will be seen that the loose grain or short straw not being moved by the rotary knives above, are conveyed toward the thresher cylinder by said belts, thereby preventing lodging or accumulation on the surface of the feed table and between the retarding fingers, E, and stopping hooks, $d^4$, of any material being threshed.

A clutch device is mounted upon shaft, $g$, which is belted from the threshing machine to impart motion to the device. The said shaft $g$ is journaled in stationary bearings in the side pieces Z of the frame of the device. Near both ends of transverse shaft, $g$, are rigidly secured thereto belt pulleys, $g^1$, which impart motion of a greater speed to the cylinder trip governor, A, by belts, $b^4$, to pulleys firmly secured to the shaft of the cylinder trip governor, A, than the speed of the band knives.

K, represents a small cog gear firmly secured to one end of transverse shaft, $g$, engaging cog gear, $K^1$, which is journally mounted on sleeve, $m$, projecting from the back surface of bevel gear, M. The face of the cog gear, $K^1$, is provided with a series of projections, $K^2$, near the edge placed in a circular form. The projections are used for the purpose of a trip device connecting the cog gear, $K^1$, and bevel gear, M. The latter is freely mounted upon the stud shaft, $m^1$, which is firmly fixed to the outside of the feeder frame in any usual manner. The bevel gear, M, is provided with a plurality of circles of cogs, $m^2$, and a projecting rim, $m^3$, on the front surface and an extended sleeve, $m$, and a trip arm eccentrically pivotally secured bevel gear, M, and it also has a trip arm, L, eccentrically pivoted with a jaw, $L^1$, adapted to engage the projections, $K^2$, on the face of cog gear, $K^1$, the trip arm, L, extending beyond the circumference of the cog gear, $K^1$; a spiral expansile spring $L^2$, is loosely placed upon an adjusting rod, $L^3$, which is loosely secured to the surface of the bevel gear, M; the end passing through the trip arm and adjusting bur, $L^4$, is adjustably secured to end of adjusting rod, $L^3$, by means of which the pressure of the trip arm may be regulated. It will be seen that the spiral spring, $L^2$, pressing against the one edge of the trip arm, L, will force it toward and against the burs on adjusting rod, $L^3$, as far as the bur, $L^4$, will permit, causing jaw, $L^1$, to engage one of the projections, $K^2$, on the surface of the cog gear, $K^1$, thereby connecting the cog gear, $K^1$, to bevel gear, M, and causing both to rotate together.

N, represents a trip lever, one end pivotally connected to frame of feeder with bolt, $n$, having trip stop, $n^1$, on its upper edge; the other end of trip lever, N, is allowed to oscillate in the keeper, $n^2$, which is secured to the frame of the device. A spiral spring, $n^3$, is connected at one end to trip lever, the other end extending upward and secured to oscillating lever, $n^4$, which is pivotally secured to the feeder frame.

$n^5$, represents a lever hook having oblong slot near one end, by means of which the hook, $n^5$, can be secured to connecting bars, C, at different elevations; the other end of hook, $n^5$, is hook-shaped by means of which the oscillating lever, $n^4$, is held close to side of connecting bars, C. It will be seen that when an excessive quantity of the material being threshed, passes under the trip governor cylinder, A, the latter will be raised along with the vibrating arms B, and connecting bars, C, upon which the oscillating lever hook, $n^5$, is secured, raising one end of the lever, $n^4$, the spring, $n^3$, and the loose end of trip lever, N, having trip stop, $n^1$, upon its upper edge, which is thereby drawn upward so that the trip arm, L, will strike against trip stop, $n^1$, thereby releasing jaw, $L^1$, from its engagement with projections, $K^2$, on face of cog wheel, $K^1$, so that the cog gear, $K^1$, and bevel gear, M, are disconnected. This movement also causes the bevel gear, M, to stop its rotary motion, stopping the retarding fingers, E, the sheaf propelling device and all intermediate connections, preventing further flow of straw or grain to the band knives and cylinder trip governor until the excessive quantity of material is fed to the cylinder of the threshing machine, when the floating cylinder trip governor lowers and the oscillating arms, connecting bar, C, vibrating lever and trip lever N, having trip stop, $n^1$, on its upper edge, is dropped accordingly by means of which the trip arm, L, is released, thereby again allowing the jaw, $L^1$, of the trip arm, L, to engage a projection, $K^2$, on face of cog gear, $K^1$, thereby connecting said cog gear and bevel gear and thus imparting motion to the retarding fingers and grain propelling devices. O, represents a bevel gear having a plurality of circles of cogs, $o^1$, and $o^2$, and a projecting rim, $o^3$, upon its face. It is rigidly secured to one end of conveyer shaft, $o^4$, which is journally connected in any usual manner to both sides of feeder frame; upon said shaft, $o^4$, is firmly secured a wooden roller, $o^5$. $o^6$, represents the end of a shaft at the front end of the self feeder, upon which is firmly secured a wooden roller. Upon the rollers, $o^4$ and $o^6$, is strapped a canvas apron, $f^4$, or any other sheaf grain propelling device. A shaft, $o^6$, having a roller mounted thereon is journaled near front end of the feeder to carry the sheaf conveyer web in the usual manner. Q, represents a pivoted bottom to further agitate and convey the material being threshed to the thresher cylinder. A grain pan, P, supported by hangers, $P^1$, pivotally connected to the feeder frame, placed below the band cutting table and pivoted bottom, motion being imparted to the grain pan by means of a pitman, $p^2$, journally connected to the crank pin $p^3$, the latter being firmly secured to the roller shaft, $f^1$. The grain pan is made in two parts but not necessarily so and connects in the center by hinges, $p^4$, and may be folded by removing intermediate connections, so as to gain access to the thresher cylinder. The grain pan is to gather the kernels and particles of grain working through and precipitating from the band cutting table of the feeder before it enters the thresher cylinder, and convey it to the threshing machine thereby preventing great waste of grain. The oscillating movements of said grain pan extend from the delivery end of the chute Q into the receiving end of the threshing machine.

R, represents a longitudinal shaft arranged parallel to the sides of the feeder frame and having suitable journal bearings, $r$ and $r^1$; it is provided with collars, $r^2$, rigidly secured thereon for keeping the flanges, $r^3$, of the pinion, $r^4$, snugly against the edges of the bevel gear, M and O, thereby guiding the pinions, $r^4$, and securing them to the proper circles. The pinions, $r^4$, are secured as desired upon shaft, R. It will be seen that thereby a rotary motion is imparted to the longitudinal shaft, R, from the shaft $g$, and conveyed to sheaf propeller shaft $o^4$, retarding finger shaft $g$ and other mechanism pertaining to the lower feeding device. In order that the operator may control, stop and start the feeder at any desired place of the thresher separator and feeder, I place a cord, T, between trip lever, N, and lifter lever, $T^1$, the latter being provided with a spiral spring, $T^2$, to draw the lifting lever, $T^1$, down and prevent interference with the free and independent motion of trip lever, N; another cord, $T^3$, is connected to the lifting lever, $T^1$, and extended over and along both sides of the threshing machine and feeder, secured at farther end in any manner, to the point desired. It will be seen that by pulling the cord, $T^3$, it lifts lifting lever, $T^1$, and trip lever, N, accordingly thereby tripping the arm, L, and stopping the lower feeding mechanism. By releasing the cord, $T^3$, the spring, $T^2$, will draw lifting lever $T^1$ downwardly thereby releasing the trip lever, N, so that the feeding mechanism will start again. Angular projections, U, are secured to the inner sides of the feeder frame, extended from the band cutting table in a vertical position to the upper part of the feeder casing, by means of which the grain is guided away from close proximity to the sides of the feeder casing at that part of the self feeder where the floating cylinder trip governor, A, revolves. Said projections prevent the grain or other material, as it travels toward the thresher separator, from wrapping around the exposed parts of cylinder shaft, $a^4$, upon which the trip governor is secured; whereby free and easy oscillating movements are obtained and friction in the curved slots, $b^1$, through sides of the feeder casing, is prevented.

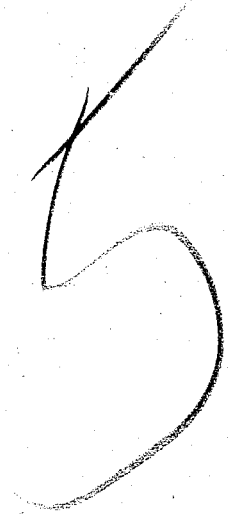

I claim—

1. A band-cutter and feeder, comprising a frame having vertical sides perforated with registering slots, a transverse shaft carrying revolving knives within the frame, a slotted band-cutting table under the knives, a pair of vibrating bars rocking on the ends of the transverse shaft without the frame, a countershaft journaled in the vibrating bars and reciprocable in said slots, a revolving feed cylinder carried by the countershaft within said frame, an endless conveyer under the knives and feed cylinder, a transverse retarder shaft under the slotted table, and a plurality of retarding fingers carried by that shaft and working through that table.

2. In a band cutter and feeder, the combination of a feeder frame with a vibrating frame pivoted therein, a rotatable straw-governing drum mounted on said vibrating frame, a balance frame pivoted on the feeder frame, a counterbalancing weight carried by said balance frame, and links connecting said balance frame to each side of said vibrating frame.

3. A band-cutter and feeder, comprising revolving knives, a subjacent perforated table, an endless conveyer having belts traveling on the table, a plurality of spaced stopping hooks pivoted under the table, means for lifting the free ends of the stopping hooks through the perforated table, a transverse shaft under the perforated table, and a plurality of retarding fingers carried by said shaft and working through said table and conveyer and between said belts.

4. In a band-cutter and feeder, the combination of a feeder frame with a vibrating frame pivotally connected therewith, a rotating straw-governing drum mounted in the vibrating frame and within the feeder frame, a balance frame pivoted on the feeder frame, links connecting the balance frame to each side of the vibrating frame, and a transverse shaft journaled in the sides of the feeder frame and carrying a plurality of retarding fingers.

5. A band-cutter and feeder, comprising a main shaft, a pair of vibrating bars rocking on opposite ends of the main shaft, a feed cylinder having its shaft journaled in the vibrating bars, a balance frame pivoted to opposite sides of the machine, and a pair of links connecting those bars respectively to that frame.

6. A band-cutter and feeder, comprising revolving knives, and a floating feed cylinder armed with circumferential rows of projecting teeth laterally inclined alternately toward the opposite ends of the cylinder, and positioned to run between the revolving knives.

7. In a self feeder and band cutter, the combination of a feeder frame; a rotary and substantially vertically movable cylinder trip governor mounted above a band cutting table; substantially vertical projections secured to the inside of the said frame in front of the ends of the cylinder trip governor shaft; a stationary band-cutting table secured to said frame; rotary shafts journaled near the ends of said band-cutting table; a plurality of belts mounted upon said shafts and encircling said table; a sheaf conveyer having its delivery end above the receiving end of said table; a chute below the delivery end of said band-cutting table; an oscillating grain pan mounted a distance below the band-cutting table and the chute, the delivery end of said grain pan reciprocating into the receiving end of the threshing machine; a detachable support for the delivery end of said grain pan connected to the receiving end of the threshing machine; and a driving mechanism for the several parts.

8. A band-cutter and feeder, comprising a frame having vertical sides perforated with registering slots, a transverse shaft carrying revolving knives within the frame, a band-cutting table under the knives, a pair of vibrating bars rockingly mounted on the ends of the transverse shaft without the frame, a countershaft journaled in the free ends of the vibrating bars and reciprocable in said slots, a revolving feed cylinder on the countershaft and within the frame, and an endless conveyer under the knives and feed cylinder.

9. A band-cutter and feeder, comprising a main shaft journaled in the frame of the machine, revolving knives carried by the main shaft, an endless conveyer and band-cutting table under the knives, a pair of parallel arms rocking on the main shaft, and a floating feed cylinder journaled in the vibrating arms and provided with circumferential rows of teeth inclined alternately toward and from the planes of the revolving knives.

10. A band-cutter and feeder, comprising a transverse knife-carrying shaft journaled in the sides of the frame, a pair of connected rock arms vibrating on said shaft, and a floating feed cylinder journaled in the vibrating arms, in combination with a transverse rockshaft journaled in the sides of the frame, and a balance frame pivoted on the rockshaft and linked to the vibrating arms.

11. In a self feeder and band cutter provided with driving mechanism; the combination with a substantially vertically movable feed cylinder of a pivoted frame in which said cylinder is journaled; a shaft carrying revolving knives, a band-cutting table below said cylinder; a rock-shaft below said table; a plurality of L-shaped hooks mounted on said rockshaft, the points of said hooks extending upward through apertures in said table; and means connected to said pivoted frame to force the points of said hooks through said apertures when said cylinder is raised above the normal height.

12. A band-cutter and feeder, comprising revolving knives, a subjacent perforated table, an endless conveyer having belts traveling on the table, a plurality of spaced stopping hooks pivoted under the table, and means for controlling the pivotal position of the hooks and for lifting the free ends of the same through the perforated table.

13. In a band cutter and feeder, the combination of a feeder frame with a vibrating frame pivoted therein, a rotatable straw-governing drum mounted in said vibrating frame, a conveyer below said drum, parallel arms connected by a rockshaft journaled in the feeder frame below said conveyer, links connecting said vibrating frame to said parallel arms, a counterbalancing weight on one of said arms, a plurality of stopping hooks on said rockshaft, and means for raising the points of said hooks through said conveyer when said drum is raised above its normal height.

14. A band-cutter and feeder, comprising a shaft carrying revolving knives, a conveyer under the knives, vibrating bars carrying a revolving feed cylinder, a balance frame linked to the vibrating bars, and a plurality of stopping hooks carried by the balance frame.

15. A band-cutter and feeder, comprising a shaft carrying revolving knives, a conveyer under the knives, vibrating bars pivoted on said shaft, a pivoted balance frame attached to the vibrating bars by links, a feed cylinder journaled in the vibrating bars, a trip arm for making and breaking engagements between the conveyer and said shaft, a trip lever to engage the trip arm, a lifting lever engaging one of said links, and a yielding connection between the lifting lever and the trip lever.

JENS H. JENSEN.

Witnesses:
S. M. GODFREY,
T. H. REASONER.

Copies of this patent may be obtained for five cents each, by addressing the "Commissioner of Patents, Washington, D. C."